April 15, 1952     W. L. PENGELLY     2,592,597
JET ACTION WASHING MACHINE Filed May 8, 1946     9 Sheets-Sheet 1

Wilbert L. Pengelly
INVENTOR.

BY
Cook and Schermerhorn
ATTORNEYS

April 15, 1952  W. L. PENGELLY  2,592,597
JET ACTION WASHING MACHINE
Filed May 8, 1946  9 Sheets-Sheet 2

Wilbert L. Pengelly
INVENTOR.

BY
Cook and Schermerhorn
ATTORNEYS

April 15, 1952

W. L. PENGELLY 2,592,597

JET ACTION WASHING MACHINE

Filed May 8, 1946

Wilbert L. Pengelly
INVENTOR.

BY
Cook and Schermerhorn
ATTORNEYS

April 15, 1952     W. L. PENGELLY     2,592,597
JET ACTION WASHING MACHINE
Filed May 8, 1946     9 Sheets-Sheet 4

Wilbert L. Pengelly
INVENTOR.

BY
Cook and Schermerhorn
ATTORNEYS

April 15, 1952     W. L. PENGELLY     2,592,597
JET ACTION WASHING MACHINE Filed May 8, 1946     9 Sheets-Sheet 8

Wilbert L. Pengelly
INVENTOR.

BY
Cook and Schermerhorn
ATTORNEYS

April 15, 1952 W. L. PENGELLY 2,592,597
JET ACTION WASHING MACHINE
Filed May 8, 1946 9 Sheets-Sheet 9

Wilbert L. Pengelly
INVENTOR.

BY
Cook and Schermerhorn
ATTORNEYS

Patented Apr. 15, 1952

2,592,597

UNITED STATES PATENT OFFICE 2,592,597

JET ACTION WASHING MACHINE

Wilbert L. Pengelly, Portland, Oreg.

Application May 8, 1946, Serial No. 668,193

7 Claims. (Cl. 68—23)

This invention relates to an improved method for washing laundry, and to a novel washing machine for carrying out the method in a series of automatic operations.

This application is a continuation-in-part of my prior copending application, Serial No. 612,482, filed August 24, 1945, entitled Jet Action Washing Machine.

The method and machine of the present invention constitute a new approach to the problem of washing fabrics and laundry in general. The term washing refers to the process of removing dirt, grease, and other foreign matter from fabrics and materials by subjecting them to the action of either warm or hot water containing soap suds and applying some kind of agitation or disturbance beyond mere quiet soaking. In hand washing, the agitation is produced by squeezing, kneading, and working the fabric while submerged in soap suds or soapy water, and by rubbing action on a washboard. In conventional washing machines this agitation is usually accomplished by plungers, paddles, rotating or oscillating baffles, by a churning of the wash water and fabrics, or by a combination of these effects.

There are, however, certain objections to all of these conventional methods of washing. Mechanical agitation involving the relative movement of solid bodies having friction producing surfaces in contact with the fabric, whether occasioned by the old fashioned wash board or by plungers, paddles, or baffles in a conventional washing machine, abrade and tear fine fabrics, break and tear off buttons, and otherwise damage garments being washed and shorten the life of the fabrics of which they are made. Furthermore, the mechanical action in most conventional washing machines tends constantly to compact and compress the fabrics in a manner which has been found to promote shrinkage. It is found in the case of wool, for example, that shrinkage from washing in conventional washing machines is caused not from shortening of the individual fibers, but from a compacting of the fabricated network into which the fibers have been arranged. The apparently cylindrical surface of a single wool fiber is not smooth and freely slidable over other fibers, but is relatively very rough microscopically by reason of the fact that it consists of the projecting ends of overlapping scales or plates. Such fibers slide more easily in one direction than the other and tend to interlock with each other so that they will not readily return to their original positions. Thus, when woolen fabrics are compacted by squeezing or pounding or beating, the threads and strands and individual fibers slide over one another and tend to interlock in new positions into which they have been forced by the mechanical action. This results in shrinkage of the fabric or garment, and while the fact that woolen fabrics have a tendency to shrink when washed is well known it is not believed that the reason for such shrinkage has heretofore been generally known. At least it is not evident that this knowledge has been applied prior to the present invention in the design of conventional washing machines, which invariably promote rather than prevent shrinkage.

A general object of the present invention is, therefore, to provide a new and improved laundering method and machine which do not inflict mechanical damage upon the laundry, and which tend to unfold and pull the fabric thereof rather than to compact and compress it.

In the present method and machine there is no recourse to mechanical agitation or compression of the laundry by rigid or semirigid surfaces. Soapy wash water is brought into intimate contact with all parts of the material to be washed by projecting a plurality of high pressure jets or streams against the material to drive the soapy water through the mesh in the fabric in a novel manner to accomplish certain new results. The laundry to be washed is floated in a manner to facilitate its constant motion under the action of the water streams, and these streams are turned in directions to keep the laundry constantly turning over and advancing from one stream to the next without coming to rest and piling up in any inactive position. The streams are arranged to impinge upon outer or peripheral portions of the laundry mass in substantially tangential directions with respect to the center of the mass so as to pull and tend to mildly stretch the fabric, and to cause the mass to revolve and move under such action. The tangential forces exerted by the streams tend to produce rotation of the mass in the manner that a floating ball may be spun in the water by directing a stream of water tangentially against its surface. The driving force of the streams thereby pulls the material around in a rotary movement to bring different parts of the material successively into position for stream action and this motion is maintained continuously during the washing operation. In this action a considerable amount of air is driven under and into the laundry mass, keeping it buoyant and loose and freely mobile in the supporting water. The rising air bubbles continually find their way to the top of the water and carry with them soap molecules which are holding the dirt in suspension. Streams of considerable energy may be directed in this manner against a laundry mass which is free to move and rotate to yield to the force of the water, without damage to the material. Furthermore, the action of the streams brings the aerated soapy water repeatedly into high velocity contact with all parts of the fabric structure, driving through and against the mesh or weave to carry foreign matter away more quickly and thoroughly than can be accomplished by mechanical agitators.

During this method of washing, the clothes are subjected to five separate and distinct washing actions introducing new conditions not used heretofore:

1. High pressure streams of soapy wash or clear rinse water are driven against the garments and through the mesh in the fabrics when they are near the surface and directly under the jets.

2. The force of the streams drives the garments down through the body of water and up the opposite side of the tub.

3. Air bubbles are driven down into the water and under the mass of clothes, creating the gentle action of aeration and flotation as the bubbles find their way to the surface.

4. The clothes are pulled or drawn back across the surface of the water until they come under the next jets and are driven down again.

5. The offset or staggered positions of the jets cause the clothes to continually change positions, always coming back under a different jet.

The belief has sometimes been entertained that prolonging the time of a washing operation will result in more thorough removal of dirt from fabric. It has been found, however, that soapy water removes dirt and grease by forming insoluble curds in a form of flotation process, and that once this process has taken place, no more cleaning action will occur, regardless of how long the washing time may be extended. After the curd formation has been accomplished it is found that further washing or soaking in the same wash water merely serves to redistribute the separated dirt and scum back into all the laundry in the water, thereby destroying the beneficial results of the flotation separation. It is found to be most efficacious to immediately remove the soapy scum which contains the removed dirt as soon as possible after it is first formed and concentrated in the wash water. By drawing off the dirt and scum at the optimum time a maximum cleansing action is obtained in which all the dirt is removed that can be removed with that particular batch of wash water, after which further washing would only serve to redistribute the dirt that has already been separated.

A further object of the invention is, therefore, to provide an improved method of washing utilizing jet action of soapy water to quickly remove dirt and form insoluble substances containing such dirt in the wash water, and then to draw off the wash water quickly at the optimum time to prevent redistribution of the dirt into the laundry.

Another object of the invention is to provide an efficient apparatus which will operate automatically in a cycle of soaking, washing, rinsing, and drying operations to carry out the above described method of washing.

Another object is to provide a washing machine free enough from vibration to eliminate the necessity for bolting or fixing to a floor or mount.

Another object is to provide a washing machine of great durability, long life, and quiet vibrationless operation which is of relatively simple construction having no moving parts in rubbing contact with the laundry.

Another object is to provide a washing machine loading, unloading, dialed and controlled from the top of an upright cabinet at a sufficient height to eliminate stooping or bending while operating.

Another object is to provide a washing machine having a spinning clothes basket rotated by a pump-driven hydraulic turbine to perform a drying operation.

Another object is to provide a turbine driven washing machine having a hydraulic pumping arrangement and automatically operated control valves for filling the washer tub, producing the washing action, draining the tub, and damp drying the laundry.

Another object is to provide a hydraulic turbine drive for spinning the clothes basket to obviate the necessity for mechanical transmission elements such as clutch, belts, gears, and the like, for rotating the basket at the desired speed and for accelerating up to such speed.

Another object is to provide a washing machine in which the clothes are automatically distributed in a position within a spinning basket by stream action during the washing operation to substantially eliminate vibration in the spinning basket during the drying operation by preventing unbalance from bunching or balling up of the clothes.

Another object is to provide a spinner basket having a substantial mass to exert a stabilizing flywheel influence tending to reduce vibration.

Another object is to provide valve and control instrumentalities which will not be hindered in their operation by scum and soap curds in the wash water.

These and other objects are accomplished in the preferred embodiments of washing machines illustrated on the accompanying drawings showing novel mechanical apparatus for carrying out the method of the invention. The operating and control mechanisms of the washing machine are contained within a cabinet having a top opening for the reception of laundry to be washed. Laundry deposited in this opening is received in a perforated spinner basket in a washing tub in the upper part of the cabinet. The cabinet also contains a pumping and piping system equipped with suitable electrically operated control valves for directing the water flow to the tub, turbine and drain at the proper times to accomplish in timed sequence the necessary stages in soaking, washing, rinsing, and drying operations which together constitute the complete operating cycle of the washing machine. The spinner basket for the clothes is rotated by a hydraulic turbine driven by water supplied by an electric motor operated pump. A series of cam switches in a time control mechanism may be set to first operate the proper valves to fill the tub to the proper level and then to operate other valves to project continuous streams of recirculated wash water upon the laundry to produce the unique washing action previously described. In the washing stage, the water streams not only carry the soapy water into the fabric of the cloth and carry the dirt out, but also exert a gentle pulling action on the fabric, and physically move the laundry mass, piece by piece to turn it over and over and distribute it uniformly around the spinner basket, After this washing action has proceeded for a predetermined interval of time the automatic timer turns off the washing streams and initiates the draining stage which in one embodiment of the invention precedes a spin dry stage and which in another embodiment of the invention takes place concurrently with the spin dry stage. To produce the spinning stage the water from the tub is pumped through the turbine to gradually accelerate the spinner basket without necessarily the use of either a clutch or a belt or gear transmission drive. In that embodiment of the invention, where the draining and spinning stages are initiated simultaneously, the spinner basket is perforated only in its peripheral side walls so that as the basket starts to spin, the floating scum and soap curds will be carried away off the surface with the first water leaving the basket, without allowing an opportunity for this scum to settle onto the clothes.

Further details of the method and of the construction and operation of the washing machine will become apparent as the description proceeds in connection with the accompanying drawings in which.

Figure 1:
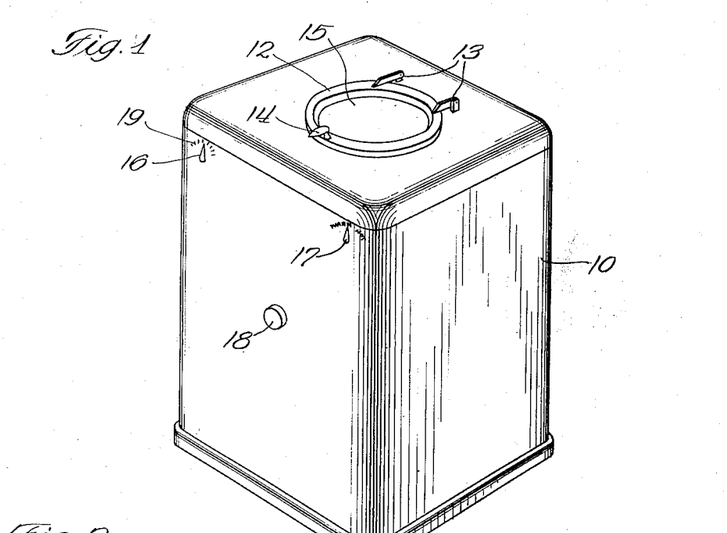
Figure 1 is a perspective view of a washing machine embodying the principles of the invention and adapted to carry out the method of the invention.
Figure 3:
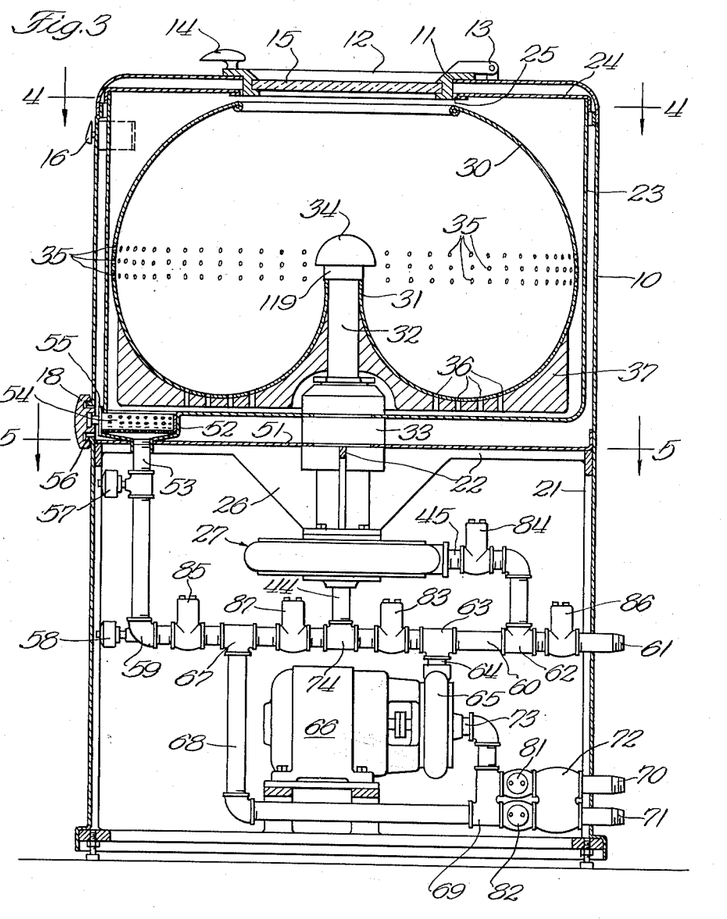
Figure 3 is a vertical sectional view of the washing machine, taken on the line 3—3 of Figure 4.
Figure 4:
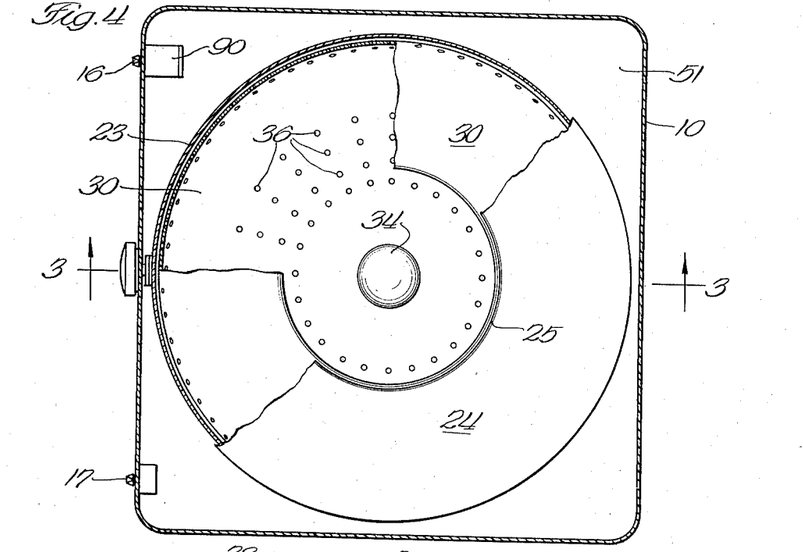
Figure 4 is a plan view, taken substantially on the line 4—4 of Figure 3, portions of the tub and spinning basket being broken away.

Referring first to Figures 1 and 3 the present washing machine comprises a generally upright, rectangular cabinet or housing 10 containing the rotatable laundry basket, together with all the necessary operating instrumentalities, piping, valves, and automatic control mechanism to carry out a sequence of operations constituting a complete washing machine cycle. In the top of the cabinet 10 is a circular opening 11 which may be closed by a cover 12 mounted on hinges 13 and provided with a lifting handle 14, and a transparent window 15 for observing the washing action. In addition to the cover 12, there are on the exterior of the cabinet 10 only two manual control knobs 16 and 17 and a knob 18 carrying a removable strainer. By means of the two controls 16 and 17, the washing machine is set in operation and temperature controlled to automatically perform in sequence the various phases of a machine cycle which leaves the laundry thoroughly rinsed and in a so-called damp dry state ready for hanging on a clothesline.

Figure 2:
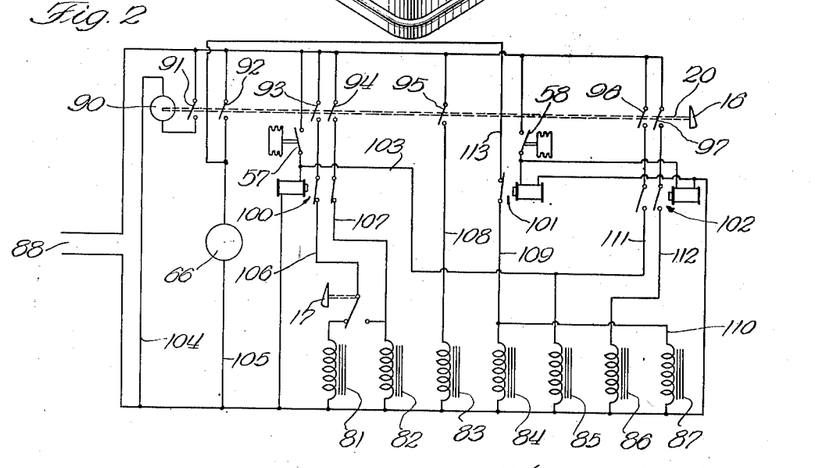
Figure 2 is a wiring diagram of an electrical system for producing a washing machine cycle in which the tub is drained before the clothes basket is spun.

Before proceeding with the details of the mechanical construction of the machine, it will be mentioned with reference to Figure 2 that the control knob 16 is mounted on a cam shaft 20 associated with a timing mechanism to open and close a plurality of control switches which are effective to produce the various functions of the machine. The construction and arrangement is such that the control knob 16 may be manually set in different positions with reference to timer dial markings 19 to start the machine on any particular operation such as pre-soak, wash, or rinse. After the control knob has been set for a certain operation, or operations, the timing mechanism assumes control to operate the pump and valves at the proper times automatically to perform the selected operations with water of the proper temperature without further attention. The control knob 17 provides a means for manually selecting either warm or hot water for the washing operation, as may be desired. The entire control system will be described in detail following the description of the mechanical construction of the machine and the piping arrangements for conducting the water for the various operations.

Referring now particularly to Figure 3, the frame of the washing machine is designated generally by the numeral 21. Cross members 22 on the frame provide a platform support for a cylindrical tub 23 having a top wall 24 with a circular opening 25 just below the top opening 11 in the outer housing. In the center of the machine, the cross members 22 form a bracket support 26 for a turbine 27 below the tub 23 and a laundry basket 30 within the tub. The basket 30 is formed with an upstanding central portion 31 by which it is mounted on the upper end of a hollow vertical shaft 32 for rotation in a bearing assembly 33 supported on the bracket 26. The numeral 34 designates a nozzle head on the top end of this shaft disposed approximately in the center of the basket both laterally and vertically, and by means of which a plurality of water jets are directed downwardly into the basket. The bottom and side walls of the basket are curved in the manner shown to form a toroidal bulge at mid height into which water will be moved by centrifugal force when the basket is rotated. The mid portion of this bulge in the region of its greatest rotating diameter is provided with a series of openings 35 for completely draining the water from the basket during the spin stage of each operation cycle. Bottom openings 36 are also provided for draining the basket prior to spinning. The numeral 37 designates a balanced mass of metal on the bottom of the basket to exert a stabilizing flywheel effect upon the basket to counteract the effects of any unbalance of weight resulting from unsymmetrical distribution of the laundry therein, although the nature of the present washing action is intended particularly to avoid any pronounced bunching of the clothes.

Figure 6:
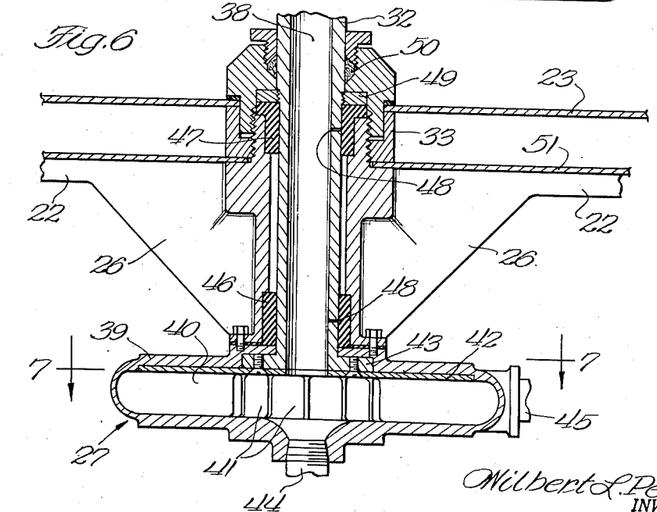
Figure 6 is a vertical sectional view taken on the line 6—6 of Figure 5, showing the turbine and shaft mounting associated with the spinning basket.
Figures 7, 8, 9:
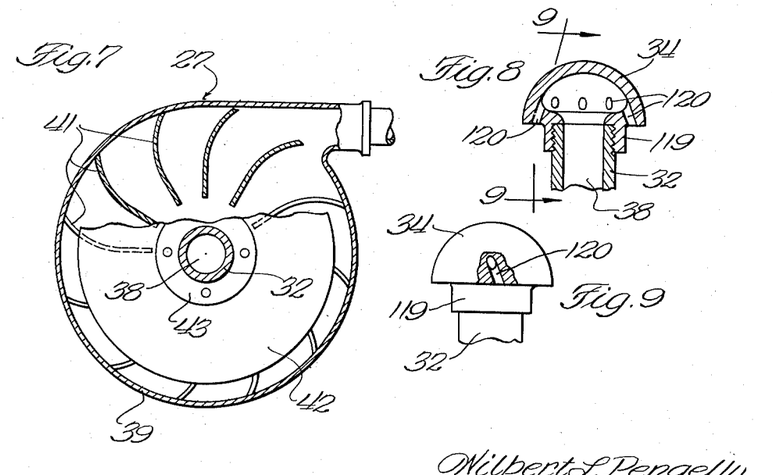
Figure 7 is a cross sectional view of the turbine, taken substantially on the line 7—7 of Figure 6.
Figure 8 is a cross sectional view of the nozzle head.
Figure 9 is a view taken on the line 9—9 of Figure 8, showing the arrangement of the nozzles in the nozzle head.

The shaft 32 has a central passage 38 extending from the nozzle head 34 down to the casing 39 of the turbine 27 where it opens into the eye of the turbine runner 40, as shown in Figure 6. The runner 40 comprises a plurality of radial blades 41 carried by a circular top plate 42 attached to a flange 43 on the end of the shaft. In Figure 7 a portion of the plate 42 is broken away to show the blades 41 in the casing 39. The central eye of the runner is open and unobstructed to carry a flow from a vertical pipe 44 into the passage 38 for discharge through the nozzle head 34 without driving the turbine. Rotation of the turbine runner is produced by introducing a flow through a tangential inlet pipe 45, in which case the central pipe 44 functions as a tail pipe for the spent water leaving the eye of the runner. When the turbine is operating, the pressure of the spent water in the center of the runner is low enough so that it will not be caused to rise in the passage 38 to be discharged through the nozzle head 34.

The bearing assembly 33 may take different forms, but in the present construction it comprises a plurality of separable elements having mutual threaded engagement for forming a water seal around the shaft 32 and for supporting the shaft on the bracket 26 to carry the weight of the spinning basket and its contents. When the turbine is operating, a substantial part of this weight may be borne by the runner plate 42 under which the water pressure produces an upward reaction, and the inner ends of the vanes 41 may be curved to increase the lifting effect of the water and to deflect the spent water downwardly to prevent it from rising in the passage 38. The numerals 46 and 47 designate resilient oil-less bearings of cutless rubber which may be lubricated by water through radial passages 48, or by other appropriate provision. The upper bearing 47 has a wide top surface forming a shoulder beneath a split ring 49 or other suitable bearing flange on the shaft 32 for supporting whatever part of the weight of the rotating assembly that is not supported by the upward reaction of the water in the turbine against the runner 40. The numeral 50 indicates a water seal packing around the shaft, and suitable packing and gaskets may be included in other joints wherever they may be found necessary. The numeral 51 designates a horizontal wall or floor plate in the cabinet below the bottom of the tub 23, the various elements of the present bearing assembly just described being arranged to clamp upon the opposite sides of these two wall members.

A depressed well or sump 52 is formed in one side of the bottom of the tub 23 for draining the tub into a tub drain pipe 53, and in this well is received a perforated strainer 54 attached to the previously mentioned knob 18. The outer end of the strainer carries a flange plate 55 having a suitable soft gasket or sealing ring to form a seal against the outer wall of the tub, and in order to maintain compression in this seal the knob 18 has an outer flange which is internally threaded for screwing on an externally threaded boss 56 formed on the cabinet wall 10. This boss has a central opening of sufficient size to permit the withdrawal of the entire strainer 54 and plate 55 therethrough for cleaning.

In the vertical drain pipe 53 are disposed a pair of pressure switches 57 and 58 responsive to the pressure head produced by the vertical height of the water standing in the drain pipe and tub, the latter of these switches in the present embodiment being incorporated in an elbow 59 connecting the vertical drain pipe with a horizontal pipe 60 which ultimately terminates in a drain outlet 61. The switch 57 is herein designated as a high pressure fill switch, and the switch 58 is designated as a low pressure drain switch.

The horizontal pipe designated generally as the pipe 60 includes a number of T connections and solenoid valves for establishing a water flow through different sections of this pipe in different stages of the operation cycles, whereby sections of this pipe at different times may convey fresh water to fill the tub, turbine spinning water, or drain water to be discharged from the machine. Thus, the T 62 connects with the inlet pipe 45 on the turbine 27, the T 63 connects with the discharge pipe 64 on a centrifugal pump 65 driven by an electric motor 66, the T 74 connects with the pipe 44, and the T 67 connects with a pipe 68 leading to a double T fitting 69. The T 69 is connected with hot and cold water supply pipe connections 70 and 71, respectively, through a thermostatic mixing valve 72, and also with an inlet pipe 73 for the pump 65.

The water supply for filling the tub is controlled by a hot fill solenoid valve 81 and a warm fill solenoid valve 82 which are interposed between the mixer valve 72 and the double T fitting 69. On the discharge side of the pump are two solenoid valves 83 and 84 designated as wash and spin valves, respectively, to direct the pump flow either into the tub through the filling pipe 44 or into the turbine through its intake pipe 45. The solenoid valve 85 is a tub drain valve, and the solenoid valve 86 is a system drain valve to control the discharge of wash water from the machine to drain the whole system. The solenoid valve 87 is designated as a turbine return valve and operates in conjunction with the other valves to allow the pump to draw water either from the tub drain pipe 53 or from the turbine discharge pipe 44 for the drain and spin stages.

These solenoid valves are represented by conventional symbols bearing the same reference characters in the wiring diagram of Figure 2, which shows the various circuit connections for operating the pump motor and the valves in the proper timed sequence to produce a complete machine cycle or one or more operation cycles as may be selected by the knob 16. Thus, the motors and solenoid valves are energized from a source of supply designated by the numeral 88 for operation under the control of various cam switches, pressure switches, electro-magnetic relay switches, and the manual switch 17. The numeral 90 designates a timing motor which drives through reduction gearing and a suitable ratchet clutch to slowly rotate the cam shaft indicated schematically by the numeral 20. The cam shaft 20 carries cams for opening and closing a series of switches 91 to 97 at the proper times to perform most of the functions of the washing machine. The cam shaft is normally driven at a constant speed by the motor 90 but by virtue of its ratchet drive it may be rotated independently of the motor by the knob 16 to any selected position with reference to the dial markings 19.

The switch 91 controls a circuit through a wire 104 for the timing motor 90 whereby this motor is started by setting the knob 16 and stopped by the return of the cam shaft to its off position. The switch 92 controls the pump motor 66, and its cam is designed to close the motor circuit through a wire 105 to operate the pump for filling the laundry tub for soak, wash, and rinse operations, for spinning the basket, and for draining the tub. Switches 93 and 94 are in the circuit wires 106 and 107 leading to the respective hot and warm water valves 81 and 82, but further control of the operation of these valves is exercised by the selector switch 17, and also by the double pole relay switch 100 under the control of the pressure switch 57. Spin valve 84 and turbine return valve 87 are controlled by the single pole relay 101, through the branching circuit wires 109 and 110 from a wire 113, and this relay is in turn controlled along with the double pole relay 102 by pressure switch 58. The relay 102 controls two circuits 111 and 112 jointly with the cam switches 96 and 97, the wire 112 energizing the drain switch solenoid 86 individually, and the wire 111 providing a circuit to the tub drain valve 85 in parallel with a wire 103 from the pressure switch 57. Switch 95 controls the wash valve 83 individually through the circuit wire 108. The sequence and coordination of these switching operations will be described in detail in connection with the operating stages and cycles of the machine.

Figure 10:
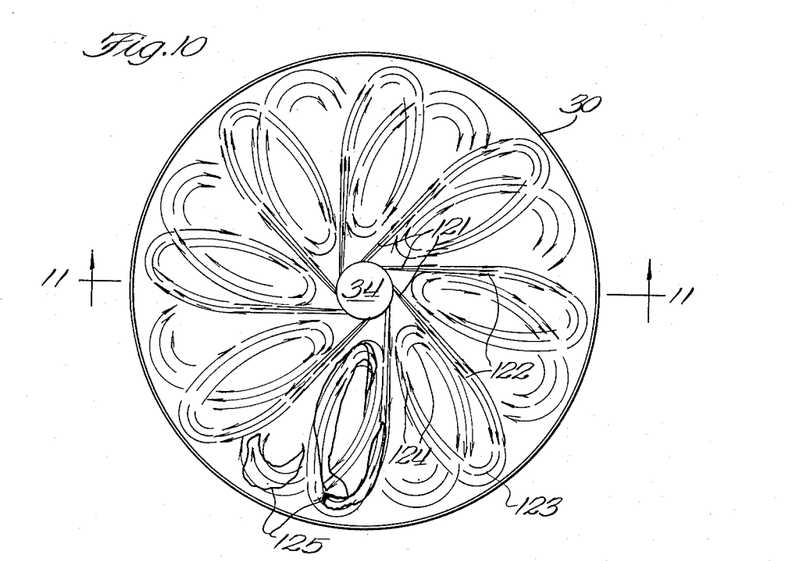
Figure 10 is a plan view inside the laundry basket, taken substantially on the line 10—10 of Figure 11, showing the nature of the circulation produced by the water jets from the nozzle head.
Figure 11:
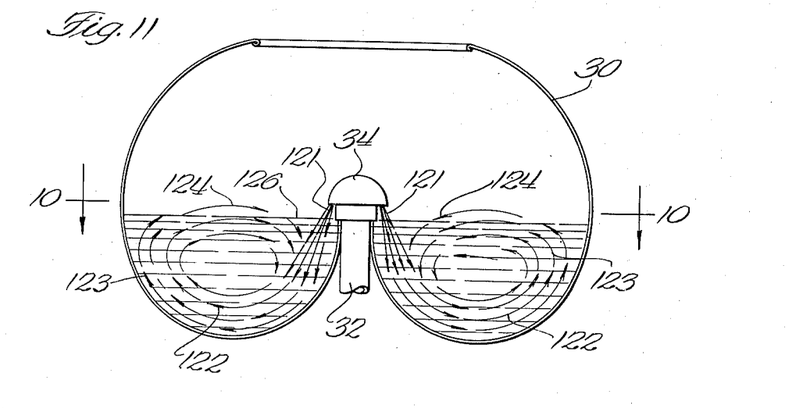
Figure 11 is a vertical sectional view of the circulation pattern as it appears in the plane of the line 11—11 in Figure 10.

The construction of the nozzle head 34 is shown in Figures 8 and 9. This head has a dome shaped top and a screw threaded shank 119 for mounting on the upper end of the hollow shaft 32 in communication with its interior passage 38, which construction results in a head of mushroom shape to accommodate a plurality of downwardly directed nozzle openings 120. These nozzles are inclined both outwardly from the shaft 32 and away from radial planes through the shaft axis, the directions of jets of water from the nozzles being shown in plan and elevational views in Figures 10 and 11. The numeral 121 indicates the water jets leaving the nozzles at angles to radial planes through the spinner basket 30, as shown in Figure 10, and inclined outwardly from the shaft 32 as shown in Figure 11. Each jet is deflected in a curved path 122 along the bottom of the basket and then upwardly at 123 along the curved side walls of the basket. The curvature of the bottom and sides of the basket thereby deflects the stream of each jet 121 into a circular flow which returns toward the center of the basket at 124. Because of the angle of the nozzles in the head 34, this flow does not recirculate in the same path, but advances around the basket so that each returning top flow 124 mixes with the next jet 121 instead of the jet of its origin.

Thus, portions of articles of laundry 125 engaged by the jets 121 are first driven downwardly causing the rest of each article so engaged to be pulled along in the stream. The articles are then moved across the bottom and upwardly and returned in a circular flow for similar action by the next jet, which circular motion is continued from jet to jet around the basket to bring the wash or rinse water into repeated intimate contact with all parts of the laundry and to drive it into and through the fabric without the destructive action of mechanical agitators. Upon leaving the nozzles the jets 121 flow close along the inner walls of the basket so as to engage the peripheral portions of a laundry mass to exert a pulling action on the material, rather than a compressing and compacting action which would result if the jets were directed toward the center of the mass. The wash water is thoroughly aerated by this process, and a multitude of air bubbles are driven into and under the mass of laundry to make it buoyant and loose and yieldable to follow the stream paths above described. Individual small articles of laundry cannot be isolated in this process, because they are continually being delivered to a new jet to receive fresh impetus in their circular motion. A large mass of laundry is treated in the same way by the combined action of all the jets. The thoroughness of this circulating motion allows the soap to complete its action quickly on the entire contents of the basket to most efficiently remove the dirt from the laundry.

Figures 12 to 15, respectively, illustrate the filling, washing, draining and spinning stages which comprise the principal functions of the machine in each of the operation cycles designated as pre-soak, wash, first rinse and final rinse. The following table shows the valve and switch positions for each stage in the various operation cycles, it being understood that the knob 16 may be set to commence machine operation at the first, or fill stage in any of these operation cycles, to perform a whole machine cycle consisting of pre-soak, wash, first rinse and final rinse operations, or only those operations desired, such as perhaps only the final rinse:

*Valve positions for four major stages in each operation cycle*

| Stage | Valves | |
|---|---|---|
| | Open | Closed |
| Fill | 81–83, or 82–83 | 84–85–86–87 |
| Soak, wash or rinse | 83–85 | 81–82–84–86–87 |
| Drain | 85–86 | 81–82–83–84–87 |
| Spin [1] | 84–87 | 81–82–83–85–86 |
| Off | None | All |

[1] Note: In spin stage, valves 84 and 87 open and close intermittently and alternately with valves 85 and 86 to bleed excess water out of system.

Timer cam shaft contact index

| Operation Cycles and Stages for Complete Machine Cycles | | Switch Contacts | |
|---|---|---|---|
| | | Open | Closed |
| Pre-Soak | Fill | 93-96-97 | 91-92-94-95 |
| | Soak | 93-96-97 | 91-92-94-95 |
| | Drain | 93-94-95 | 91-92-96-97 |
| | Spin | 93-94-95 | 91-92-96-97 |
| | Slow | 92-93-94-95 | 91-96-97 |
| | Off | All | None |
| Wash | Fill | 94-96-97 | 91-92-93-95 |
| | Wash | 94-96-97 | 91-92-93-95 |
| | Drain | 93-94-95 | 91-92-96-97 |
| | Spin | 93-94-95 | 91-92-96-97 |
| 1st Rinse | Fill | 93-96-97 | 91-92-94-95 |
| | Rinse | 93-96-97 | 91-92-94-95 |
| | Drain | 93-94-95 | 91-92-96-97 |
| | Spin | 93-04-95 | 91-92-96-97 |
| Final Rinse | Fill | 93-96-97 | 91-92-94-95 |
| | Rinse | 93-96-97 | 91-92-94-95 |
| | Drain | 93-94-95 | 91-92-96-97 |
| | Spin | 93-94-95 | 91-92-96-97 |
| | Slow | 92-93-94-95 | 91-96-97 |
| | Off | All | None |

To fill the tub, the selector switch 17 is turned for either warm or hot water to energize one or the other of the solenoid valves 81 and 82 when the other circuit elements are completed. Then the cam shaft knob 16 is turned to the proper position to initiate the operation desired. When the cam shaft is turned to the starting position for pre-soak, this operation will be completed through the stages indicated, and then the machine will turn itself off and wait for the addition of soap and perhaps additional laundry for the main washing operation. To start the main washing operation the cam shaft is manually turned ahead of this indicated position on the dial which will cause the wash, first rinse and final rinse operations to be carried out by the timing mechanism in automatic sequence.

Since the first stage of each operation is the filling of the tube, the manual setting of the cam shaft to perform any one of the four operations immediately closes those switches necessary to start the pump and admit fresh water into the system. Thus, in each operation the starting position of the cam shaft will close the switches 91, 92, 93 or 94, and 95. In the wash operation the switch 93 is closed to supply hot water, and in the soak and rinse operations the switch 94 is closed to supply warm water, although warm water may be used exclusively in all operations by leaving the manual selector switch 17 in warm position. Switches 93, 96 and 97 are maintained in open position, assuming switch 94 to be closed. This condition of the switches will start the pump motor 66 and cause valves 81 and 83 to be opened, the valves 82, 85 and 86 to be closed. When warm water is used, the valve 82 is opened and the valve 81 closed. This condition of the valves establishes the flow path illustrated in Figure 12, whereby water is drawn from the hot water inlet 70 and pumped up through the center of the turbine runner into the basket and tub. If the system is originally empty, both pressure switches 57 and 58 will be open at the start of the filling operation, thereby allowing the valves 84 and 87 to be held open momentarily by the closed relay switch 101 until the pipe 53 is filled up to the level of the bottom of the tub. At that level the water pressure operates to close the pressure switch 58 to open the relay switch 101 and close the relay switch 102. The opening of the switch 101 allows the valves 84 and 87 to close before any appreciable motion of the basket has been produced, and the closing of the switch 102 has no effect because the switches 96 and 97 are open at that time.

Figures 12, 13:
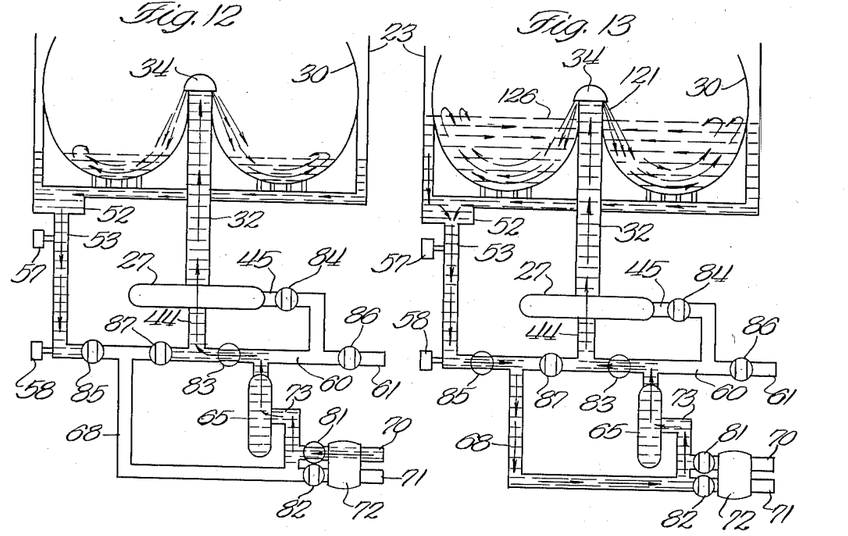
Figure 12 is a diagrammatic representation of the piping system and valves of Figure 3 showing the flow path of the water in filling the tub.
Figure 13 illustrates the water circuit through the pump and nozzle head during a washing operation.

When the tub has filled to the proper level, the water pressure acting on switch 57 causes this switch to close, thereby opening relay switch 100 to close the inlet valve 81, and energizing the solenoid valve 85 to allow water from the tub to flow back to the pump through the pipe 68. The valves 84, 86 and 87 remain closed, whereby the wash water is then pumped through the system as shown in Figure 13.

Figures 14, 15:
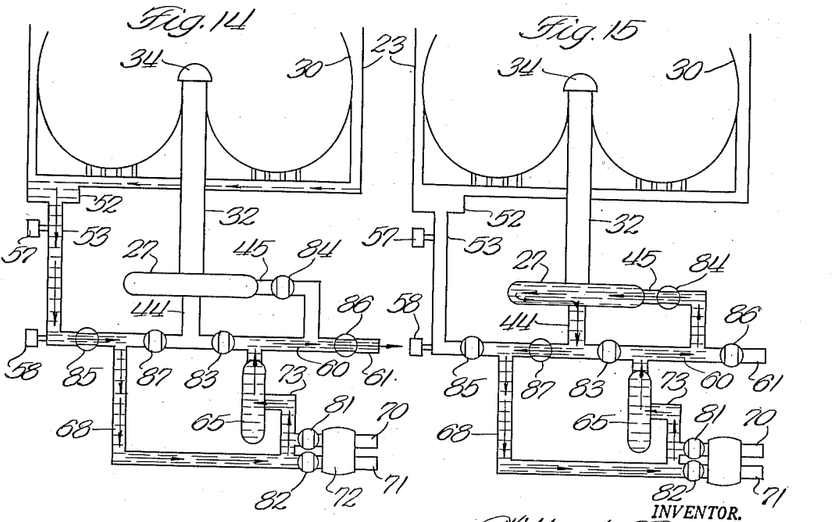
Figure 14 shows the path of the water in draining the tub.
Figure 15 shows the water circuit through the pump and turbine to spin the clothes basket.

At the expiration of a predetermined time, the timer cam shaft opens the switches 94 and 95 and closes switches 96 and 97. The opening of switch 94 produces no change in the system because the circuit controlled thereby has already been opened by the relay switch 100, but the opening of switch 95 allows the valve 83 to close. The closing of switches 96 and 97 completes a pair of circuits through the already closed double pole relay switch 102. One of these circuits opens the drain valve 86 and the other establishes a new circuit for holding the tub drain valve 85 open. The valves 83, 84 and 87 now being closed, and the valves 85 and 86 being open, the tub is drained by the pump, as shown in Figure 14. When the water level falls in the tub, the pressure switch 57 opens, but this action has no immediate effect because of the holding circuit through wire 103 held by the relay switch 102 as long as there is a sufficient head of water above the pressure switch 58.

Then when the water level drops in the pipe 53 below the bottom of the tub, the pressure switch 58 opens, causing the relay switch 101 to close, and the relay switch 102 to open. This action closes the valves 85 and 86 and opens the valves 84 and 87 to establish a water circuit through the pump and turbine as shown in Figure 15 to spin the basket 30. It is to be noted that the pressure switch 58 is adjusted to open as soon as the tub is drained, so as to leave enough water in the system to provide a hydraulic transmission of power between the pump and the turbine.

As the basket spins, water is expelled from the laundry, and this water collecting in the pipe 53 causes the pressure switch 58 to close from time to time during the spinning operation to momentarily open the valves 85 and 86 to bleed the excess water out of the system. When the water level is again brought below the bottom of the tub, after each such bleeding operation, the switch 58 returns to open position to resume the spin stage.

The duration of the spin stage is determined by the time control mechanism which is adjusted to allow sufficient time for drying the clothes to a damp condition. At the end of the wash and first rinse operations, the machine returns to the fill stage to initiate a new operation cycle, but at the end of the pre-soak and final rinse operations, the cam shaft opens all of the switches to shut the machine off. The timer is preferably designed to accommodate the four operation cycles within one revolution of the cam shaft to produce the pre-soak, wash, first rinse, and final rinse operations without necessarily requiring any operation cycle to duplicate a preceding cycle.

In the pre-soak and final rinse operations, a slow stage is provided to bring the spinning basket to rest before the system is drained. In this stage the valves are all closed and the pump motor is shut off by the opening of cam switch 92 before the timer motor switch 91 opens. The dead water in the turbine casing then acts as a brake on the turbine runner to bring the basket to rest so that the laundry may be handled or removed. At the end of the wash and first rinse operations the spinning of the basket is quickly retarded by the immediate refilling of the tub.

In conventional washing machines having spinner baskets, the basket is usually driven positively by a direct mechanical connection with a motor requiring either a gear or a belt transmission and a clutch for connecting and disconnecting the basket from the motor. When the usual mechanical clutch is engaged to spin the basket, the latter is suddenly accelerated, producing a strain on the mechanism and severe vibration if the laundry is not first properly distributed in the basket. In the present machine the laundry is distributed around the basket by the force of the jets which tend to drive the clothes uniformly to the outer edges of the basket where they are left distributed so that no severe condition of vibration can arise. The turbine drive for the spinning basket constitutes its own fluid clutch to assure a slow take up or start, gaining speed as the clothes lose their water content and the resistance decreases. Thus, through this self equalizing action the speed is automatically regulated, thereby relieving the mechanism of all severe strains incident to spinning, and during the spin, vibration is reduced to a minimum by the flywheel effect of the weight on the bottom of the basket. The use of resilient, cutless water lubricated bearings on the spinner shaft or axis tends to absorb minute vibrations and add quietness not found in hard surface bearings.

These four important factors are responsible for a quiet, vibrationless spin:

1. Clothes automatically distributed by wash action before spin.
2. Gradual slow start and increase of speed in inverse relation to the water content and weight of the clothes, automatically reaching maximum spinning speed as water content is diminished (self equalizing).
3. Stabilizing flywheel.
4. Shaft in rubber bearings absorbing small amplitude, high frequency vibrations.

It will be apparent that the present machine does not require a water supply under pressure to fill the tub nor waste water facilities below the level of the machine for draining, as the pump is capable of drawing water up from any available source and of discharging the wash water on a higher level, as for instance, into a laundry tray or wash basin. Thus, the machine is well adapted to use rain water, which is collected in some parts of the country especially for washing, without requiring the hand filling of the tub from rain barrels or other reservoirs which may be at some distance from the place most suitable for the laundry work. The machine is also particularly suited for use in apartments and other dwelling places not provided with a floor drain. These various advantages of the present machine extend its usefulness to many environments and situations where it is not practical to operate conventional washing machines.

Figure 16:
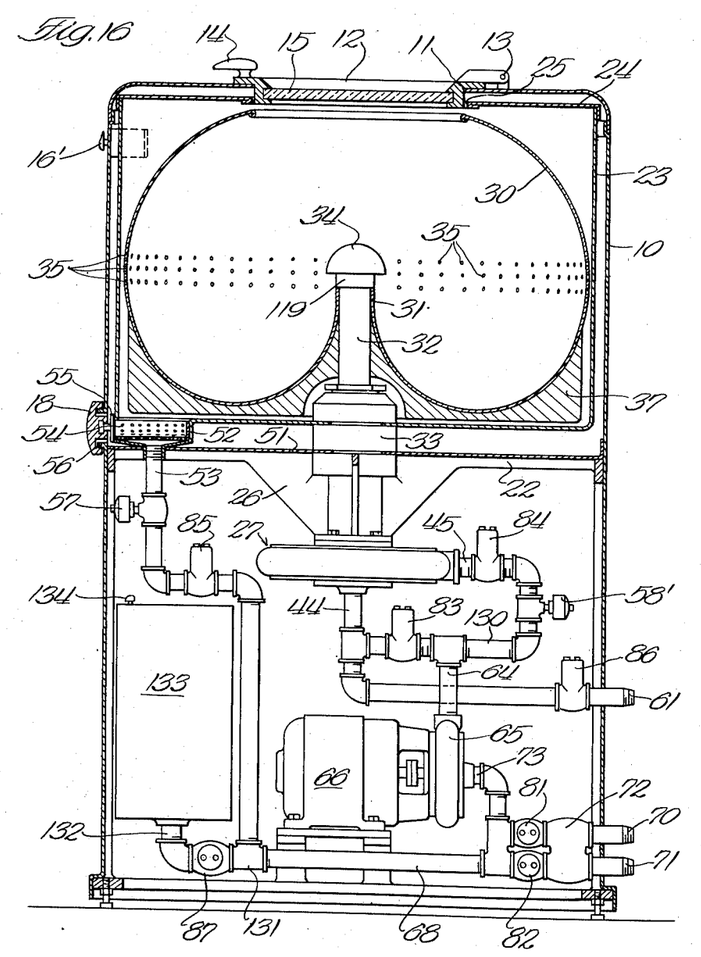
Figure 16 is a longitudinal sectional view of a modification in which the spinning of the basket is initiated concurrently with the draining of the tub.

Figure 16 illustrates a modified construction having a different arrangement of piping and valves in order to combine the drain and spin stages in each operation. This modification changes the operating cycle of the foregoing machine from a four stage cycle machine to a three stage cycle machine by combining the last two stages of drain and dry into one combination stage. This construction cuts the overall washing time by as much as 25% and also eliminates the use of two relay switches. Another definite advantage is that by spinning the water out of the basket rather than draining through the bottom, the scum floating on the wash water is the first to be drawn off, thus preventing it from settling on the clothes. In this construction the same reference characters are used to identify those parts which are common to the first embodiment hereinabove described. The discharge from the pump 65 passes through a pipe 64 from which it may be directed in any one of three different paths depending upon the position of the solenoid valves 83, 84, and 86. When the valve 84 is open the discharge from the pump is directed into the turbine 27 to spin the laundry basket 30. When the valve 83 is open the discharge from the pump is directed through the vertical pipe 44 to the nozzle head 34, and when both the valves 83 and 86 are open the machine is drained through the drain pipe 61. The pressure head established by the pump is at all times communicated by a pipe 130 with a high pressure switch 58' which is maintained in closed position by such pressure. The switch 58' is thereby maintained in closed position as long as the pump is operating with sufficient water in the system to fill the piping arrangement just described, but as soon as the system is drained to the point where the pump no longer establishes a fluid pressure at this level, the switch 58' responds by opening its contacts.

The tub is drained by a solenoid valve 85, and the pressure switch 57 is at all times responsive to the liquid head thereabove in the drain pipe 53 and in the tub. When the drain valve 85 is opened, the pipe 53 communicates with a pipe 68 leading back to the pump intake pipe 73. A T-fitting 131 in the pipe 68 provides a branch line 132 through the solenoid valve 87 to a water storage tank 133. This arrangement hastens the draining of the tub by providing two outlets for the water carried by pipe 53 when the valve 87 is open. A portion of the tub contents thereby passes through pipe 68 to the pump and another portion through pipe 132 to fill the tank 133. This lowers the water in the tub immediately so that it does not retard the speed of the basket which is starting to spin as a result of the drain water being passed through the turbine as it is pumped out of pipe 61. An air relief valve or vent 134 is provided on the top of the tank to allow the escape of trapped air.

Figures 17, 18:
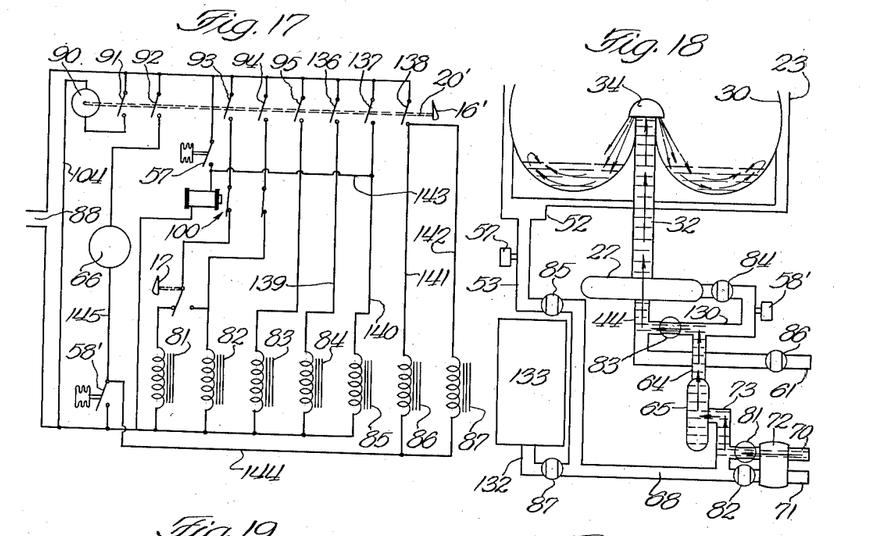
Figure 17 is a wiring diagram of the electrical control system used in the modification shown in Figure 16.
Figure 18 is a flow diagram showing the path of the water in filling the tub in the modification shown in Figure 16.

Figure 17 discloses the wiring diagram for the control system used in the modification of Figure 16. Those elements in common with the wiring diagram of Figure 2 bear the same reference numerals. The functions of all parts bearing the same reference numerals as used in Figure 2 is essentially the same as in the first embodiment, although they may be arranged differently in the piping system shown in Figure 16. Thus, the valves 81 to 87 correspond to the similarly numbered valves in Figure 2, and the cam switches 91 to 95 also correspond, although their cam operators would not necessarily be identical because of the consolidation of the drain and spin stages in the embodiment of Figures 16 and 17. This difference is indicated by priming the reference characters 16 and 20 applied to the control knob and cam shaft. In addition to the cam switches just mentioned the cam shaft 20' also carries the cam switches 136, 137, and 138, these switches being connected with wires 139 to 142 leading to the solenoid switches 84 to 87. A wire 143 connects the switch 137 with the operating coil of the relay switch 100 to form an operating or holding circuit in addition to the circuit through the pressure switch 57. The high pressure switch 58' is connected with the motor wire 145 to control the motor 66 jointly with the cam switch 92, and is also connected with the wire 144 to control the solenoid valves 86 and 87 jointly with the cam switch 138.

The valve and switch positions for each stage in the various operations of the embodiment of Figure 16 shown in the following tables:

*Valve positions for three major stages in each operation cycle*

| Stage | Valves | |
|---|---|---|
| | Open | Closed |
| Fill | 81-83 or 82-83 | 84-85-86-87 |
| Soak, wash or rinse | 83-85 | 81-82-84-86-87 |
| Drain and spin | 84-85-86-87 | 81-82-83 |
| Off | None | All |

*Timer cam shaft contact index*

| Operation cycles and stages for Complete Machine Cycle | | Switch Contacts | |
|---|---|---|---|
| | | Open | Closed |
| Pre-Soak | Fill | 93-136-137-138 | 91-92-94-95 |
| | Soak | 93-136-137-138 | 91-92-94-95 |
| | Drain and Spin | 93-94-95 | 91-92-136-137-138 |
| | Off | All | None |
| Wash | Fill | 94-136-137-138 | 91-92-93-95 |
| | Wash | 94-136-137-138 | 91-92-93-95 |
| | Drain and Spin | 93-94-95 | 91-92-136-137-138 |
| 1st Rinse | Fill | 93-136-137-138 | 91-92-94-95 |
| | Rinse | 93-136-137-138 | 91-92-94-95 |
| | Drain and Spin | 93-94-95 | 91-92-136-137-138 |
| Final Rinse | Fill | 93-136-137-138 | 91-92-94-95 |
| | Rinse | 93-136-137-138 | 91-92-94-95 |
| | Drain and Spin | 93-94-95 | 91-92-136-137-138 |
| | Off | All | None |

Figure 19:
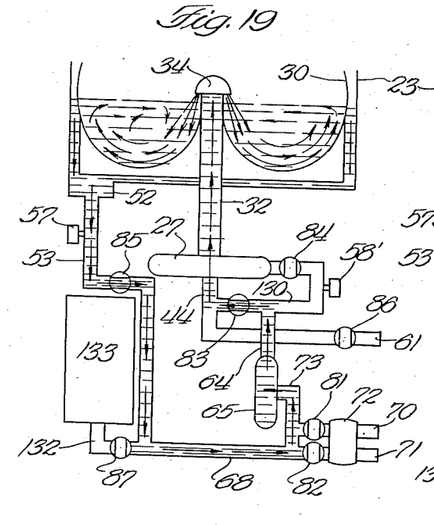
Figure 19 shows the water circuit through the pump and nozzle head in a washing operation in the modification shown in Figure 16.
Figure 20:
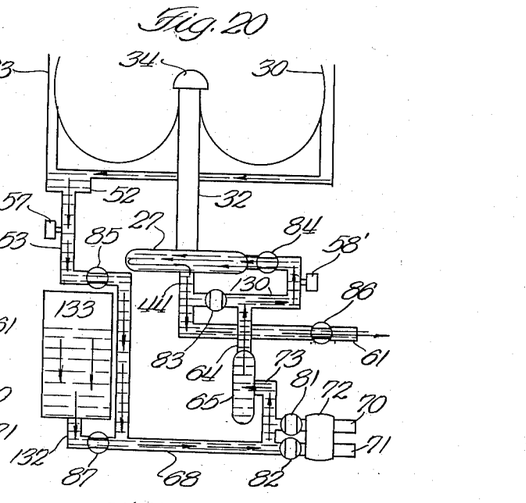
Figure 20 shows the path of water flow during the combined drain and spin stage in the modification of Figure 16.

The operation of the system illustrated in Figures 16 and 17 will now be described with reference to the water flow diagrams in Figures 18 to 20. The machine is started by turning the knob 16' of the time control mechanism to an index mark designating the desired operation, thereby closing switches 91 and 92 to start the time and pump motors 90 and 66, and closing switches 93 (or 94) and 95 to open solenoid valves 81 (or 82) and 83. Assuming the machine to be drained, the pressure switches 57 and 58' will at first be open but the admission of water pressure through the fill valve immediately establishes pressure in the pipe 130 to close the switch 58'. The filling stage is thereby commenced with water being pumped through the pipes and open valves as shown in Figure 18. The tub continues to fill until the pressure head created by the height of the water operates pressure switch 57 to close a circuit to the relay switch 100 and the solenoid valve 85. Energization of the relay switch 100 operates to close the inlet valve 81 (or 82) so that with the opening of valve 85 a fluid circuit is established through the pump as shown in Figure 19. This fluid circulation will be maintained for a time interval governed by the design of the cams which operate the various cam switches whereby the interval may be of different duration in the soak, wash, and rinse operations.

The soak, wash, or rinse periods are terminated by the timer closing the switches 136, 137, and 138 to open the solenoid valves 84, 86 and 87. Cam switch 95 is opened at the same time to close the valve 83. Water is then pumped from the tub through the turbine and out the drain pipe 61, and the sizes of the various pipes are proportioned with relation to the capacity of the pump and the fluid resistance in different parts of the system to cause the tank 133 to immediately fill upon opening of the valve 87. The capacity of the tank 133 is sufficient to rapidly lower the level of the water in the tub, and as the head in the pipe 53 becomes less the water which has been transferred to the tank 133 starts to flow into the pump as shown in Figure 20. During the drain stage, all the water discharged from the drain pipe 61 is pumped through the turbine to produce rotation of the laundry basket 39. As the water level immediately falls in the tub, the frictional drag on the rotating basket is reduced, causing the rotational velocity to be accelerated by the pumping action of the hydraulic drive to produce centrifugal force to expel additional water from the laundry through the holes 35, which water adds to the supply available for driving the turbine as it is pumped out of the drain.

In the embodiment of Figure 16 it will be noted that the laundry basket 39 has an imperforate bottom whereby water can leave the basket into the tub 23 only when the basket is rotating to carry the water up the side walls and over the holes 35. Thus, in the beginning of the spin stage the water in the tub 23 around the basket supplies the pump and fills or partially fills the tank 133 as the turbine is just beginning to rotate. The back pressure created by the turbine while it is stationary or rotating very slowly operates to reduce the pump flow so as to insure the filling of the tank 133 in the early part of the draining stage. Inasmuch as the basket is filled substantially up to the level of the holes 35 a relatively slow rotation of the basket will quickly relieve the basket of most of its free water content which is not held in the laundry. The early removal of the bulk of the water in the basket thereby permits it to accelerate at an increasing rate, particularly also in view of the fact that the water is removed from the tub faster than it is discharged through the holes 35 so as to eliminate any water drag on the outside of the basket.

The reason for making the bottom of the basket imperforate and causing it to discharge its water content solely through the holes 35 is to first remove the floating scum and soap curds from the top of the water to prevent this material from settling onto the laundry as the water level goes down. Thus, the flotation separation process by which soap removes dirt and foreign material from fabric is utilized to the best advantage by first drawing off the scum and curds so that they cannot become redistributed into the laundry. For the reasons previously discussed it is highly desirable when washing by soap action producing insoluble curds to terminate the washing action abruptly and remove such curds as soon as they become collected or concentrated in the form of curds and scum apart from the fabric. The present apparatus is accordingly highly efficient in quickly separating the dirt and froth from the laundry at the proper time to obtain the most effective cleansing action. As the basket starts to rotate, the top of the wash water in the basket is drawn off first as though by a skimming action, and the bulk of the water quickly follows as the basket gains speed. When the basket is relieved of the main weight of the water, it accelerates faster and finally attains a relatively high speed to centrifuge most of the water content out of the laundry. The parts are so designed and proportioned that by the time the system has pumped itself dry the basket has attained the desired top speed.

When all the water has thus been pumped out of the system, there is not sufficient pressure to maintain the pressure switch 58' closed, and this switch then opens to stop the pump and to de-energize the solenoid valves 86 and 87, allowing them to return to closed position. The timing motor 90 then continues to turn, either to start the next fill stage, or to shut the machine off completely after the pre-soak and last rinse. If the tub is to be refilled, one or the other of the cam switches 93 and 94 will close, allowing water to enter the system to build up pressure again to close the pressure switch 58' to restart the pump motor. This modification differs from the first embodiment in that ordinary house water pressure is necessary on the intakes 70 and 71 in order to close pressure switch 58' to start the motor 66. The positions of the various valves will then be as shown in Figure 18, although different portions of the cams will be effective on the switches in the different operations. When the tub is refilled, the presence of water therein quickly stops the rotation of the basket 30, and when the tub is not refilled the basket will spin for some time to remove additional moisture from the laundry.

Figure 21:
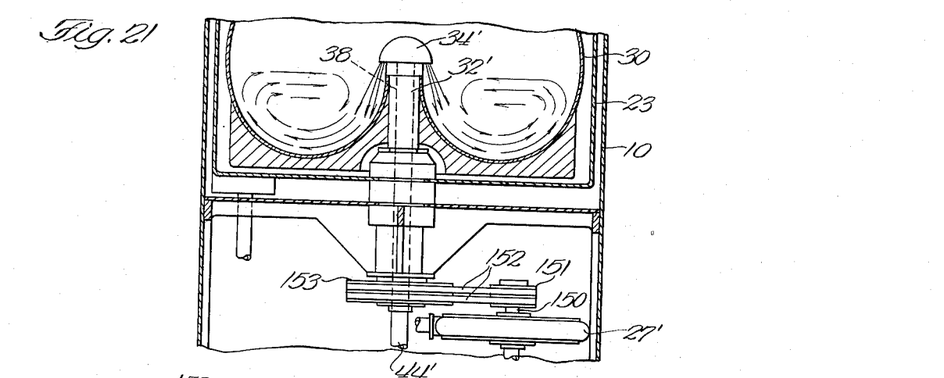
Figure 21 illustrates a modified construction in which the laundry basket is belt driven from the turbine.

In the two embodiments of the invention thus far described, the laundry basket 30 is rotated by a turbine runner attached directly to the shaft 32 of the basket and water is introduced into the basket through a central nozzle head 34. The functions of rotating the basket and introducing the water jets may be accomplished in other ways to carry out the method of the invention, as shown in Figures 21 to 24. In Figure 21, for example, the basket is rotated by a belt drive from a water turbine which is mounted at one side of the shaft 32'. Here the turbine 27' has a runner shaft 150 to which are attached a plurality of small pulleys 151 carrying belts 152 for driving larger pulleys 153 on the lower end of the shaft 32'. The pipe 44' may then extend into the hollow shaft 32 either to communicate with its central opening 38 or to extend therethrough so that the nozzle head 34' may be carried directly by the stationary pipe 44'.

Figure 5:
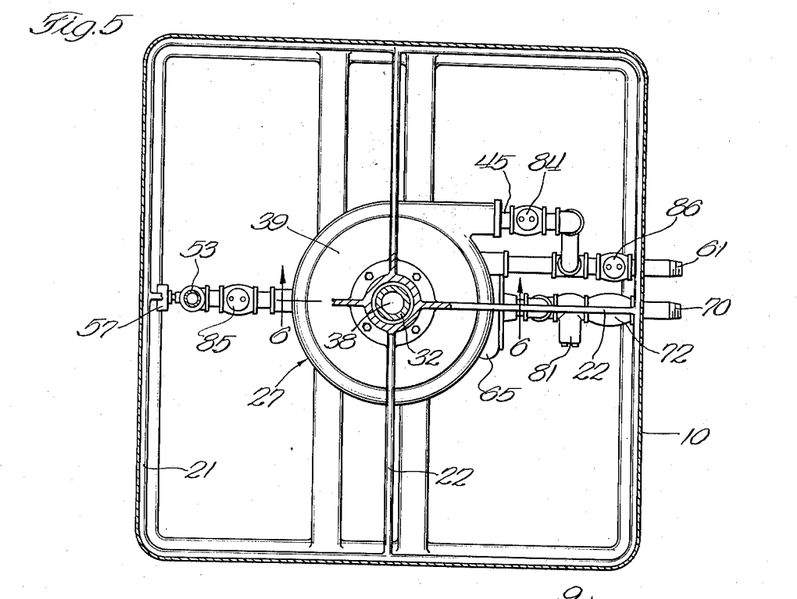
Figure 5 is a horizontal cross sectional view, taken on the line 5—5 of Figure 3.
Figure 22:
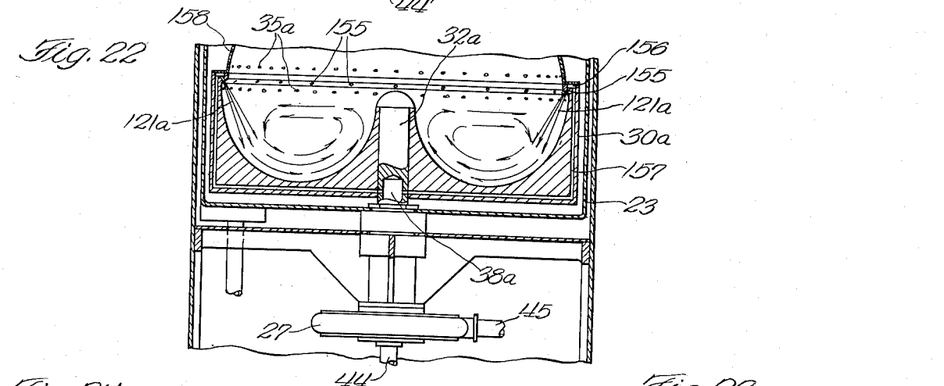
Figure 22 illustrates a modified construction in which the nozzles are arranged around the rim of the laundry basket.
Figure 23:
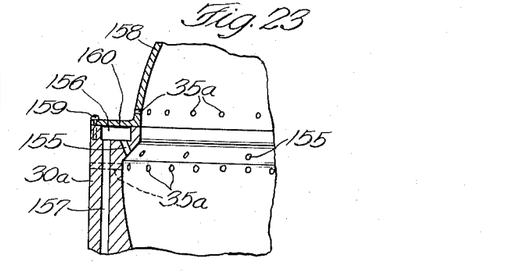
Figure 23 is an enlarged fragmentary sectional view of the nozzle arrangement shown in Figures 22 and 24.

In Figure 22 the laundry basket 30a is driven directly by the turbine 27 as in Figures 3 and 16, but the water is introduced in jets 121a around the periphery of the basket instead of from the center thereof. These jets issue from nozzle openings 155 which are inclined both with respect to the vertical as shown in Figure 22 and with respect to radial planes through the spinning shaft 32a. The circulating motion of these jets is the reverse of that shown in Figures 10 and 11, but the jets engage the laundry mass tangentially to turn it over and advance it around the basket to produce essentially the same washing action. The nozzles 155 are in communication with an annular passage or conduit 156 supplied by pipes or channels 157 in the bottom of the basket which are in communication with the hollow center 38a of the shaft. Water is supplied to the center passage 38a by the pipe 44 as in Figure 5. The passage 38a, however, terminates just above its communication with the passages 157, the upper end of the shaft 32a being solid. The drain openings 35a may be located just above and below the ring of nozzle openings 155. This construction is shown in greater detail in Figure 23 wherein the top part of the basket 30a is seen to constitute a separate piece 158 which is secured by bolts 159 to the lower part. The channel 156 is formed as a groove in the wall section of the lower part of the basket, which is covered and enclosed by a flange 160 on the top section 158 when the latter is secured in place. Still other constructions may be devised to utilize inclined peripheral nozzles to produce the same washing action.

Figure 24:
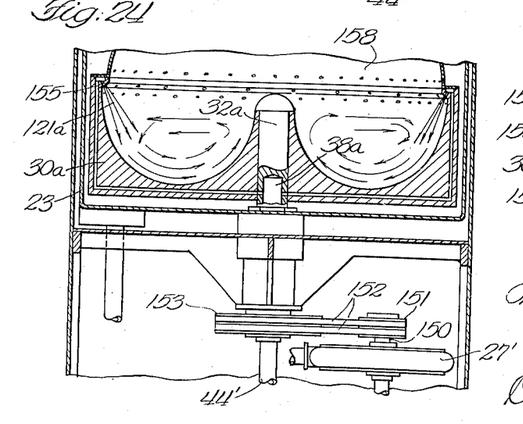
Figure 24 shows a further modification incorporating both the belt drive of Figure 21 and the rim nozzles of Figure 22.

The modification shown in Figure 24 combines the features shown in Figures 21 and 22. In this arrangement the basket 30a is driven by belts 152 from a turbine 27' positioned at one side of the shaft 32'. The water jets 121a are directed inwardly from inclined nozzles 155 in a rim portion of the basket. The reference numerals applied in Figure 24 correspond to parts similarly designated in Figures 21 and 22.

It is to be understood, of course, that the physical disposition of the piping and valves is arranged on the drawings in such manner as to most clearly illustrate the invention, and that in practice it is desirable to dispose these elements in a more compact arrangement, and having due regard, also, for provision for draining the system substantially dry when the last operation is completed.

It is also within the contemplation of the invention to prolong the spin period by the addition of fresh water for this purpose, or to accomplish the entire spin stage with fresh water instead of used wash or rinse water. Such changes in the cycle may easily be made by merely altering the cam operators for certain of the valves.

Further changes in the construction and arrangement of parts will occur to persons skilled in the art and it will be apparent that certain features and advantages of the invention may be utilized either singly or collectively in other combinations than those illustrated without departing from the spirit of the invention, and all such modifications within the scope of the appended claims are included in the invention.

Having now described my invention and in what manner the same may be used, what I claim as new and desire to protect by Letters Patent is:

1. In a washing machine, a tub, a washing and centrifuging basket in said tub, a turbine having driving connection with said basket, a pump for circulating water through said tub in a washing operation and for driving said turbine in a centrifuging operation, a switch responsive to water pressure in said tub for initiating a washing operation, a time controlled switch for terminating the washing operation and initiating a centrifuging operation, and a switch responsive to water pressure at the pump outlet to stop the pump when the water has been pumped out of the system.

2. In a washing machine, a tub, a washing and centrifuging basket mounted for rotation in the tub, a hydraulic turbine having driving connection with said basket, a pump, a system of pipes inter-connecting said tub, turbine and pump, valves in said pipes, a fluid pressure switch actuated by water pressure in the tube when the tub is filled for operating certain of said valves to connect the inlet and outlet of said pump with said tub for circulating water through the tub in a washing operation, a time controlled switch operating certain of said valves to connect the pump outlet with said turbine for draining the tube and initiating a centrifuging operation, and a fluid pressure switch actuated by drop in water pressure at the pump outlet to stop the operation of the pump when the water has been pumped out of the system.

3. A washing machine comprising a tub, a spinner basket mounted for rotation in said tub, a turbine having driving connection with said basket, a tub drain, a pump, a pipe connection from said tub drain to the inlet of said pump, a tank connected with said pipe connection, pipe connections from the outlet of said pump to said turbine to drive said turbine with tube water, and a drain pipe for the machine connected with the outlet of said turbine, said tank withholding a portion of the tub water when the tub is drained to drain the tub quickly and then supply tube water to the pump and turbine for continued operation of the turbine after the tub is drained.

4. In a washing machine, a tub having a drain, a washing and centrifuging basket mounted for a centrifuging operation in said tub in the space occupied by wash water in a washing operation, a washing nozzle in said basket, a turbine having driving connection with said basket, a pump, said machine having a washing stage in which the outlet of said pump is connected to said nozzle and the inlet of the pump connected to said drain, said machine having a centrifuging stage in which the pump inlet is connected with said drain and the pump outlet is connected to said turbine, and a tank connected with said drain and pump inlet to empty said tub quickly at the beginning of the centrifuging stage and then to continue to supply water for operation of the turbine.

5. A washing machine comprising a tub, a washing and centrifuging basket mounted for rotation in the bottom of the tub for centrifuging in the space occupied by the wash water in a washing operation, a turbine having driving connection with said basket, a pump, a tub drain, a pipe connecting the inlet of said pump with said tub drain, a pipe connection from the outlet of said pump to said turbine to drive said turbine with tube water, a tank connected with said tub drain and pump inlet to receive water from the tube when the tub is drained and then supply said water to the pump and turbine for continued operation of the turbine after the tub is drained, and a switch responsive to water pressure at the pump outlet to stop the pump when the water has been pumped out of the system.

6. A washing machine comprising a tub, a washing and centrifuging basket mounted for rotation in the bottom of the tub for centrifuging in the space occupied by the wash water in a washing operation, a turbine having driving connection with said basket, a fresh water inlet, nozzles arranged to direct water jets into said basket, a tub drain, a drain pipe for the machine, a pump, pipe connections from the inlet of said pump to said fresh water inlet and said tube drain, a tank connected with said pipe connections, pipe connections from the outlet of said pump to said nozzles and to the inlet of said turbine, pipe connections from the outlet of said turbine to said drain pipe for the machine, and valves in said pipe connections arranged to direct fresh water from said fresh water inlet through said pump to said nozzles, to direct water from said tub drain through said pump to said nozzles, and to direct water from said tub drain and tank through said pump and turbine to said machine drain pipe.

7. A washing machine comprising a tub, a vertical hollow shaft in said tub, a washing and centrifuging basket mounted on said shaft for rotation in the bottom of the tub for centrifuging in the space occupied by the wash water in a washing operation, a nozzle head on the upper end of said shaft arranged to direct water jets into said basket, a turbine having driving connection with said shaft to rotate said basket, a fresh water inlet, a tub drain, a pump, pipe connections from the inlet of said pump to said fresh water inlet and said tub drain, pipe connections from the outlet of said pump to said hollow shaft and said turbine, valves in said pipe connections for supplying said pump with water from said fresh water inlet or from said tub drain and for directing the outflow from said pump either to said nozzle head through said hollow shaft or to said turbine to spin said basket, and a tank connected with the pipe connection between the inlet of said pump and said tub drain to receive water from the tub when the tub is drained and then supply said water to the pump and turbine for continued operation of the turbine after the tub is drained.

WILBERT L. PENGELLY.

REFERENCES CITED

The following references are of record in the file of this patent:

UNITED STATES PATENTS

| Number | Name | Date |
| --- | --- | --- |
| 84,923 | Waring | Dec. 15, 1868 |
| 516,877 | Rotter | Mar. 20, 1894 |
| 764,613 | Moreland | July 12, 1904 |
| 1,382,992 | Lombard | June 28, 1921 |
| 1,832,560 | Kendig | Nov. 17, 1931 |
| 1,932,246 | Kirby | Oct. 24, 1933 |
| 2,161,208 | Soderholm | June 7, 1939 |
| 2,278,911 | Breckenridge | Apr. 7, 1942 |
| 2,380,595 | Hertrich | July 31, 1945 |
| 2,411,960 | Dyer | Dec. 3, 1946 |
| 2,426,851 | Winston | Sept. 2, 1947 |

FOREIGN PATENTS

| Number | Country | Date |
| --- | --- | --- |
| 47,406 | Switzerland | July 27, 1909 |